United States Patent [19]

Irimajiri

[11] Patent Number: 4,574,902
[45] Date of Patent: Mar. 11, 1986

[54] VEHICLES

[75] Inventor: Shoichiro Irimajiri, Saitama, Japan

[73] Assignee: Honda Giken Kogyo Kabushiki Kaisha, Tokyo, Japan

[21] Appl. No.: 566,148

[22] Filed: Dec. 28, 1983

[30] Foreign Application Priority Data

Dec. 29, 1982 [JP] Japan .................................. 57-230294
Apr. 20, 1983 [JP] Japan .................................. 58-69419

[51] Int. Cl.⁴ ............................................ B60K 17/30
[52] U.S. Cl. ....................................... 180/72; 180/312
[58] Field of Search ............... 180/312, 210, 217, 296, 180/309, 63, 72, 23, 24, 241, 21

[56] References Cited

U.S. PATENT DOCUMENTS

| 3,656,572 | 4/1972 | Mercier | 180/23 |
| 3,776,354 | 12/1973 | Duclo et al. | 180/72 |
| 4,130,172 | 12/1978 | Moody | 180/72 |
| 4,178,873 | 12/1979 | Bankstahl | 180/296 |
| 4,372,417 | 2/1983 | Yamamoto et al. | 180/215 |

FOREIGN PATENT DOCUMENTS

| 404456 | 10/1924 | Fed. Rep. of Germany | 180/72 |
| 517306 | 2/1955 | Italy | 180/210 |
| 663212 | 12/1951 | United Kingdom | 180/72 |

Primary Examiner—Joseph F. Peters, Jr.
Assistant Examiner—Ross Weaver
Attorney, Agent, or Firm—Lyon & Lyon

[57] ABSTRACT

A vehicle in which a pair of driving wheels are disposed on both left and right sides of a vehicle body frame, the vehicle comprising a power unit composed of an engine and a pair of transmission devices extended from both ends of the engine to individually transmit power of the engine to the driving wheels, and a casing for the power unit supports the driving wheels and is supported on the body frame inserted between both the transmission devices.

15 Claims, 14 Drawing Figures

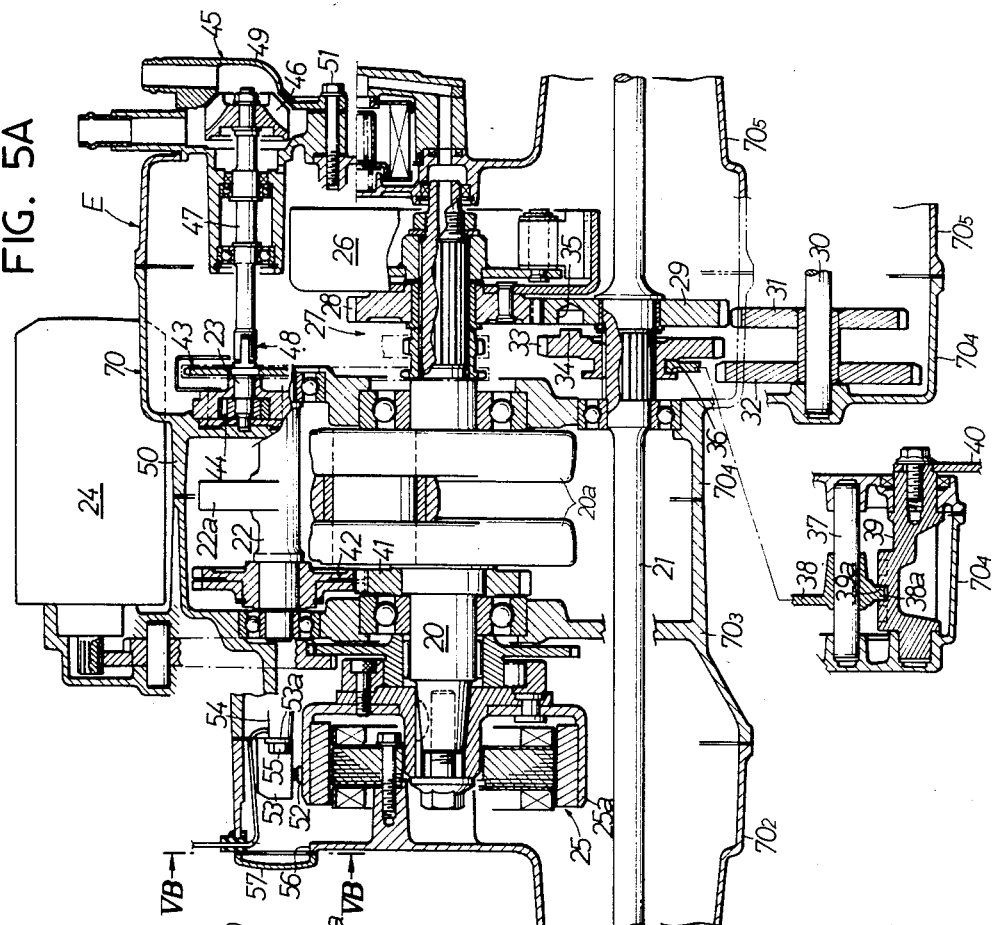

VEHICLES

BACKGROUND OF THE INVENTION

1. Field of the Invention

The present invention relates to a vehicle in which a pair of driving wheels are disposed on both left and right sides of a vehicle body frame.

2. Description of the Prior Art

In the past, in a vehicle of this kind, a wheel driving shaft is laterally mounted between a pair of driving wheels, and a transmission device for transmitting power of the engine is connected to a central portion of the driving shaft, and therefore, a body space is reduced by the presence of the transmission device, resulting in a certain limitation in an attempt of making the vehicle smaller while securing a predetermined body space.

Furthermore, the aforesaid power transmission device is composed of a transmission driven by an output shaft of the engine and a differential device driven by the transmission to distribute power to a plurality of driving wheels in response to a rotational speed difference therebetween, and therefore becomes complicated in construction.

In addition, in a vehicle having a pair of left and right driving wheels, for example, in a four wheel automobile, a supporting device for power units, a driving device for the driving wheels and a suspension device for the same are independent from each other and therefore, become complicated in construction.

Moreover, in the above-described vehicle, when the driving wheels are moved up and down, a large relative displacement occurs between the power unit and the body frame, and therefore, all pipe lines such as an intake system including a carbureter, an exhaust system including an exhaust muffler and a cooling system including a radiator are carried by the power unit. With this arrangement, however, the weight under springs is increased by said pipe lines to tend to lower somewhat the road surface follow-up properties of the driving wheels and a large movable space for the aforesaid pipe lines has to be secured, and therefore, various considerations in design are required.

In view of the foregoing, it can be considered that in order that a part of the pipe line is carried by the body frame, the pipe line is divided into a portion extended from the power unit and a portion supported on the body frame, and said portions are connected by a flexible joint. However, this flexible joint is relatively heavy, which is not suitable for a ligbt-weight vehicle.

SUMMARY OF THE INVENTION

It is a first object of the present invention to provide a small vehicle in which a vehicle body space is not reduced by a transmission device.

It is a second object of the present invention to provide a vehicle which allows a transmission to have a differential function to exclude a differential device and which has a compact and simple transmission device.

It is a third object of the present invention to provide a vehicle in which a supporting device for a power unit, a driving device for driving wheels and a suspension device for the same are integrally formed with each other by designing their components to be used in common to each other so as to render the construction of the whole device simple, compact, light-weight and rigid.

It is a fourth object of the present invention to provide a vehicle provided with a device for driving and suspending driving wheels in which a movable angle of the driving wheels is restrained to be small while sufficiently securing strokes of upward and downward movement of the driving wheels without increasing the load under springs.

It is a fifth object of the present invention to provide a vehicle provided with a device for supporting a power unit, driving and suspending driving wheels in which twist vibrations of the engine caused by variation in torque of a crank shaft can be absorbed so as to minimize the transmission of the vibrations to the body frame to enhance comfortableness to ride.

It is a sixth object of the present invention to provide a vehicle provided with a simple and effective pipe line device in which the pipe line is divided into a portion extended from a power unit and a portion supported on a vehicle body frame, said portions being bendably connected by making use of pivots which pivotably support the power unit on the body frame, whereby an increase in weight under springs caused by the pipe line can be restrained as small as possible, a movable space for the pipe line can be materially reduced, and no special flexible joint is required.

To achieve these objects noted above, in accordance with the present invention, there is provided a vehicle in which a pair of driving wheels are disposed on both left and right sides of a vehicle body frame, said vehicle comprising a power unit composed of an engine and a pair of transmission devices extended from both ends of said engine to individually transmit power of the engine to said driving wheels, a casing for said power unit being formed into a rigid body, said casing supporting said both driving wheels and being supported on said body frame inserted between said both transmission devices.

In accordance with the present invention, there is further provided a vehicle wherein both transmission devices are arranged substantially horizontally.

In accordance with the present invention, there is further provided a vehicle wherein said both transmission devices comprise a belt type automatic transmission which connects an output shaft of the engine to said driving wheels.

In accordance with the present invention, there is further provided a vehicle wherein said casing is pivotably supported on said body frame through pivots so as to allow upward and downward movement of said both driving wheels, and a suspension spring device is interposed between said casing and said body frame.

In accordance with the present invention, there is further provided a vehicle wherein said pivot is supported between a plurality of support brackets projected on said casing and a plurality of support caps secured to said support brackets by means of bolts, and mating surfaces between each set of said support brackets and caps are deviated each other in the peripheral direction of said pivot.

In accordance with the present invention, there is further provided a vehicle wherein said casing comprises a plurality of blocks divided in an axial direction of said pivot, said blocks being connected, and said support brackets are projectingly provided on said blocks.

In accordance with the present invention, there is further provided a vehicle wherein said support brackets and said caps respectively have semi-circular supporting surfaces between which said pivot is held, said bolt comprises a through-bolt which is threadably engaged with said support brackets extending through said cap and said pivot, and said suspension spring device is interposed between said pivot and said body frame.

In accordance with the present invention, there is further provided a vehicle wherein said pivot is arranged so that it may pass the center of gravity of said power unit or the neighbourhood thereof.

In accordance with the present invention, there is further provided a vehicle wherein said pivot is arranged on substantially the same axis as that of the crank shaft of said engine.

In accordance with the present invention, there is further provided a vehicle wherein a casing for a power unit supports driving wheels driven by said power unit and is pivotably supported on a vehicle body frame through a pivot so as to allow upward and downward movement of said driving wheels, said pivot being formed into a hollow configuration and secured to said power unit, a first pipe line supported on said casing being connected to said pivot, a second pipe line supported on said body frame being connected relatively pivotably to said pivot, said first and said second pipe lines being communicated through the hollow portion of said pivot.

In accordance with the present invention, there is further provided a vehicle wherein a casing for a power unit supports driving wheels driven by said power unit and is pivotably supported on a vehicle body frame through a pivot so as to allow upward and downward movement of said driving wheels, said pivot being formed into a hollow configuration and secured to said power unit, a first pipe line supported on said casing being connected relatively rotatably to said pivot, a second pipe line supported on said body frame being connected to said pivot, said first and said second pipe lines being connected through the hollow portion of said pivot.

With the construction as described above, the space between both left and right transmission devices can be effectively utilized as a space for the vehicle body to secure a predetermined space for the body without being disturbed by the transmission devices, thus achieving miniaturization of the vehicle. Furthermore, the power unit and both the driving wheels constitute a single assembly, and therefore, assembling, maintenance and mounting the same on the body frame can be easily carried out.

Both the transmission devices are arranged substantially horizontally, whereby the center of gravity and the height of the power unit can be sufficiently lowered while securing the space for the body between both the transmission devices to obtain a vehicle whose center of gravity is low.

Moreover, both the transmission devices are made to comprise belt type automatic transmissions which connect the output shaft of the engine and the driving wheels, whereby the automatic transmissions cooperate with each other to effect a differential action corresponding to a rotational speed difference between both the driving wheels to properly transmit power to each of the driving wheels. Thus, a special differential device is not required and a vehicle provided with a power transmission device which is simple and compact in construction can be obtained.

In addition, the casing is pivotably supported on the body frame through the pivot so as to allow upward and downward movement of both the driving wheels and the suspension spring device is interposed between the casing and the body frame, whereby the casing for the power unit displays a swing arm function for suspending the driving wheels and can be pivotably moved as the driving wheels are moved up and down. Thus, a swing arm need not be provided specially. The casing further displays a stabilizer's function and can restrain vibrations of each of the driving wheel. Thus, a stabilizer need not be provided specially. Supporting of the power unit and suspension of both driving wheels can be effected by a common pivot and suspension spring device. As a consequence, it is possible to obtain a vehicle in which driving and suspension devices are simple and compact in construction.

Furthermore, the mating surfaces between the plurality of support brackets projectingly provided on the casing and the plurality of support caps fastened to the support brackets by means of the bolts are deviated from each other in the peripheral direction of said pivot in order to support said pivot, whereby even if each of the fastening bolts has a weak portion, said portion is not one-sided and the pivot can be rigidly supported in all directions to contribute to strengthening of the pivotal connecting construction of the power unit and body frame.

In addition, said casing is constructed such that the plurality of blocks divided in the axial direction of said pivot are fastened together, and the support brackets are projectingly provided on the blocks, whereby said plurality of blocks are fastened each other even by said pivot to obtain a casing which is easy in casting and rigid, as a consequence of which the casing can be made smaller in wall-thickness and lighter in weight.

Said pivot is held between the semi-circular supporting surfaces of the plurality of support brackets projectingly provided on the casing and the semi-circular supporting surfaces of the plurality of the supporting caps fastened to the support brackets through the through-bolts and said through-bolt is made to extend through the pivot, whereby said through-bolt not only fastens the support cap to the support bracket but also functions as locating means, anti-rotation means and anti-disengagement means for the pivot. Thus, the pivot can be secured to the casing simply and positively at a predetermined position. The pivot supports the power unit, suspends both the driving wheels and also serves as a member for mounting the suspension spring device on the casing side. As the result, the device for supporting the power unit and the device for driving and suspending the driving wheels can be made to render the construction thereof simple and compact.

The pivot is arranged so that it may pass the center of gravity of the power unit or the neighbourhood thereof, whereby an inertia moment of the pivotal system around the pivot including both the driving wheels and power unit can be restrained to be small, as a consequence of which the load under spring is reduced to materially enhance the road surface follow-up properties of the driving wheels to obtain good comfortableness to ride.

Also, the pivot is arranged on substantially the same axis as that of the crank shaft of the engine, whereby the twist vibration of the engine resulting from variation of torque of the crank shaft is generated about the pivot, and the vibration is effectively absorbed by the suspension spring device to prevent propagation of the same to the body frame to enhance comfortableness to ride.

Moreover, in the vehicle wherein the driving wheels driven by the power unit are supported on the casing for the power unit, and the casing is pivotably connected to the body frame through the pivot, said pivot is formed into a hollow configuration, which is secured to one of the power unit and the body frame, the first pipe line supported on one of them is connected to the pivot, and the second pipe line supported on the other is connected relatively pivotably to the pivot, said first and second pipe lines being communicated together through the hollow portion of the pivot, whereby when the power unit is pivotally moved, the first and second pipe lines can be bended around the axis of the pivot to always maintain their communicating condition without any trouble. The weight under springs is relieved through a portion of the second pipe line supported on the body frame as compared with the structure wherein all the pipe lines are carried by the power unit, and therefore, the road surface follow-up properties of the driving wheels can be enhanced to obtain good comfortableness to ride. Since the first pipe line is merely pivotally moved together with the power unit, the pivotal space is considerably reduced and the first and second pipe lines can be disposed in a narrow space. In addition, the pivot serves as a joint to bring the first pipe line into communication with the second pipe line and a special flexible joint need not be provided so that the construction is simple, and this can be effectively applied particularly to a small and light-weight vehicle.

The above and other objects, features and advantages of the present invention will become apparent from the description of several preferred embodiments hereinafter described in detail in connection with the accompanying drawings.

BRIEF DESCRIPTION OF THE DRAWINGS

FIGS. 1 to 7 show a first embodiment of the present invention, wherein;

FIG. 1 is an exploded perspective view of a vehicle showing a state wherein a power unit is separated from a vehicle body frame;

FIG. 2 is a plan view of the vehicle;

FIG. 3 is a side view of the vehicle;

FIG. 4 is a side view of the power unit;

FIG. 5 is a plan view of the power unit with essential parts sectioned;

FIG. 5A is an enlarged longitudinal plan view of an engine portion in the power unit;

FIG. 5B is a sectional view taken on line VB—VB of FIG. 5A;

FIG. 6 is a side view of a power transmission system in the engine;

FIG. 7 is an enlarged sectional view taken on line VII—VII of FIG. 5;

FIGS. 8 and 9 show a second embodiment of the present invention, wherein;

FIG. 8 is a plan view of the power unit with essential parts sectioned;

FIG. 9 is a sectional view taken on line IX—IX of FIG. 8;

DESCRIPTION OF THE PREFERRED EMBODIMENTS

Several preferred embodiments of the present invention will be described hereinafter in connection with the accompanying drawings.

Figure 1:
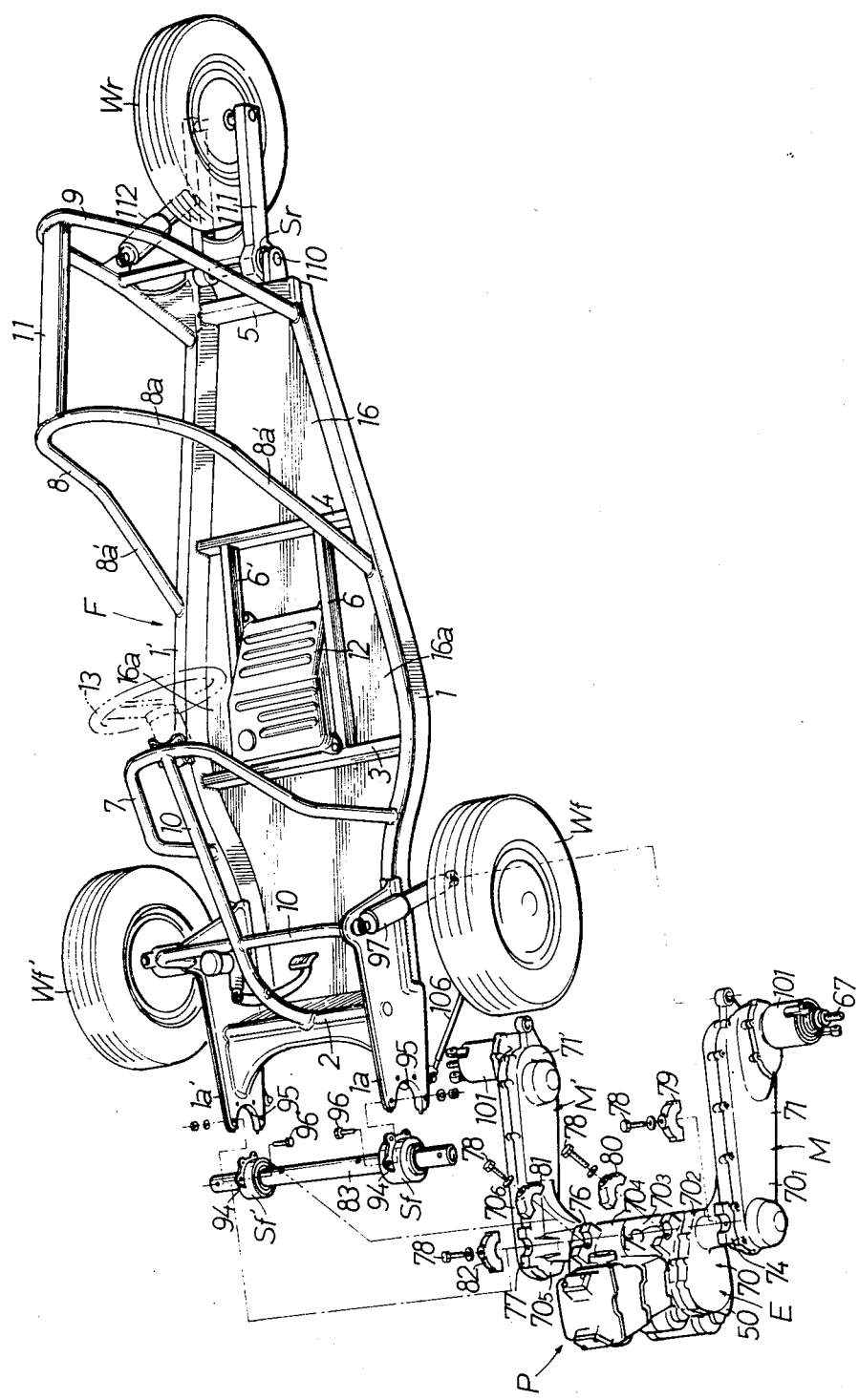
Figure 2:
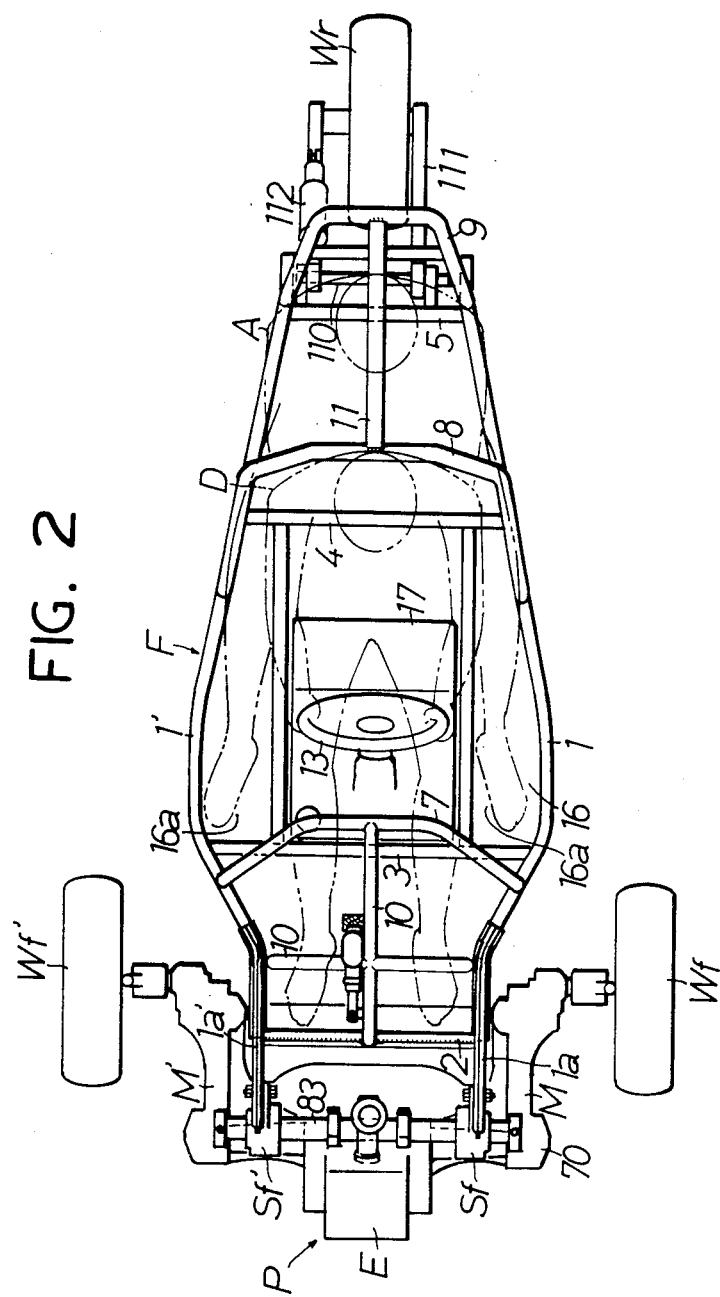
Figure 3:
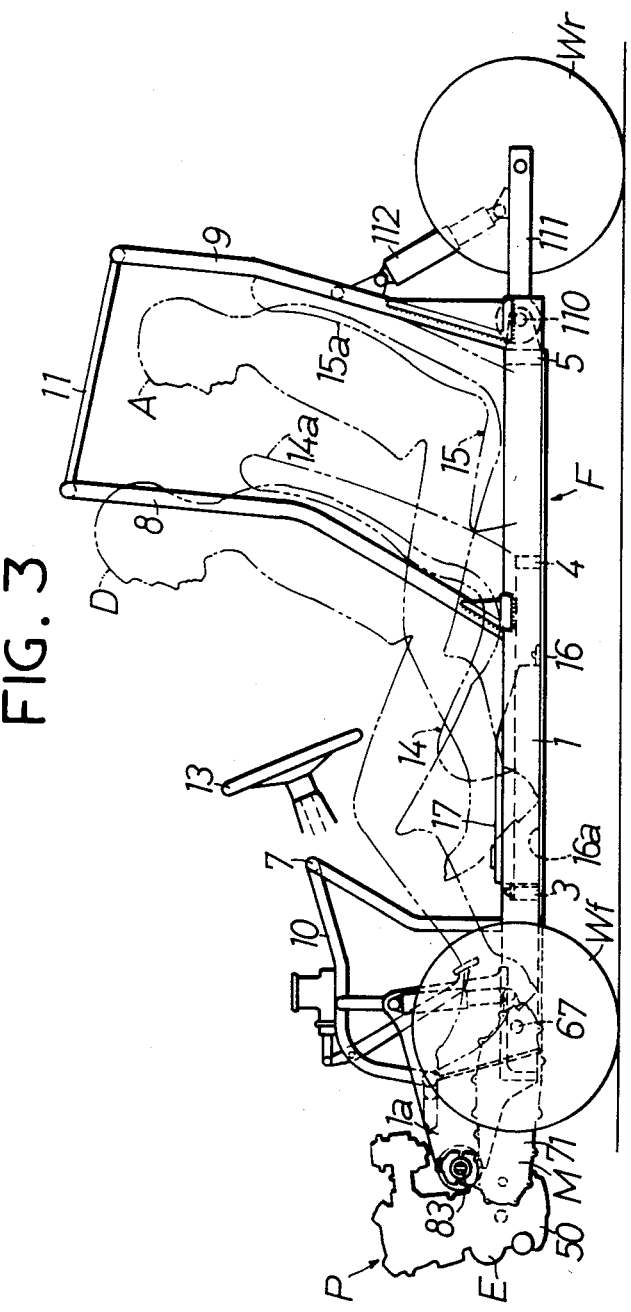

First, a first embodiment shown in FIGS. 1 to 7 will be described. Referring to FIGS. 1 to 3, the illustrated vehicle is of a three wheel type in which frontwardly of a vehicle body frame F are disposed a pair of left and right driving wheels Wf, Wf' and a power unit P for driving said driving wheels, and rearwardly thereof is disposed a single driven wheel Wr.

The body frame F comprises a pair of left and right longitudinal members 1, 1' with support plates 1a, 1a' stood upright at front ends, a plurality of lateral members 2, 3, 4 and 5 for connecting said longitudinal members in a ladder-like fashion, a pair of left and right reinforcing members 6, 6' for connecting the intermediate two lateral members 3, 4, and three inverted U shaped roll bars 7, 8 and 9 connected to a front portion, a central portion and a rear portion of the longitudinal members 1, 1' so as to connect the latter. Four elements, that is, the front bar 7, the foremost lateral member 2 and the left and right support plates 1a, 1a' are connected through a cross-shaped reinforcing member 10, and the central roll bar 8 and the rear roll bar 9 are connected at their tops through a reinforcing member 11. A steering column for supporting a steering handle 13 is mounted on the central portion of the front roll bar 7.

A fuel tank 12 is disposed between the pair of reinforcing members 6, 6' along the center line between both the longitudinal members 1, 1', and the fuel tank 12 is bolted to the lateral member 3 and both the reinforcing members 6, 6'. The fuel tank 12 is disposed at the position of centroid or in the neighbourhood thereof of the three wheel automobile as a completed vehicle equipped with necessary parts not shown in FIG. 1. The position of centroid of the three wheel automobile is hardly changed due to the increase or decrease in fuel accommodated into the fuel tank, and the characteristics of the vehicle such as the accelerating performances, cornering or the like are not changed due to the quantity of fuel storage.

A floor plate 16 is lined on the lower surface of the body frame F, a front seat 14 for a driver D and a rear seat 15 for an occupant A are arranged on the upper surface thereof in a longitudinal row and close to each other, and the fuel tank 12 is positioned under the front seat 14. At this time, back rests 14a, 15a of both the seats 14, 15 are arranged substantially along the central roll bar 8 and the rear roll bar 9, respectively. It is of course that these roll bars 8, 9 are preselected to a height above the heads of the driver D and occupant A.

Spaces occupied by left and right feet are formed in a wide area of the body frame F from both left and right to the front portion of the front seat 14, and the upper surface of the floor plate 16 where said foot spaces are positioned is formed with a surface 16a occupied by foot.

The driver D sits on the front seat 14 and the occupant A sits on the rear seat 15. At this time, the occupant A stretches his feet frontwardly so as to hold the backrest 14a of the front seat 14 from both sides to put the feet on the foot surface 16a to pose the stabilized seated attitude.

Acting points of the weights of the driver D and occupant A are made close to each other by arrangement of the front and rear seats 14 and 15 in a longitudinal row and close to each other as described above. Thus, variation in position of centroid of the whole vehicle resulting from the increase or decrease of occupants can be minimized to normalize the characteristics such as the accelerating performances, cornering and the like of the vehicle.

The driver D and occupant A are protected by the front, central and rear roll bars 7 to 9, an intermediate portion of a frontward lateral pipe 8a of the central roll bar 8 is bended downwardly and a lower half portion 8'a is frontwardly extended and gently inclined, and therefore the occupant A can easily get on and off the vehicle.

Figure 4:
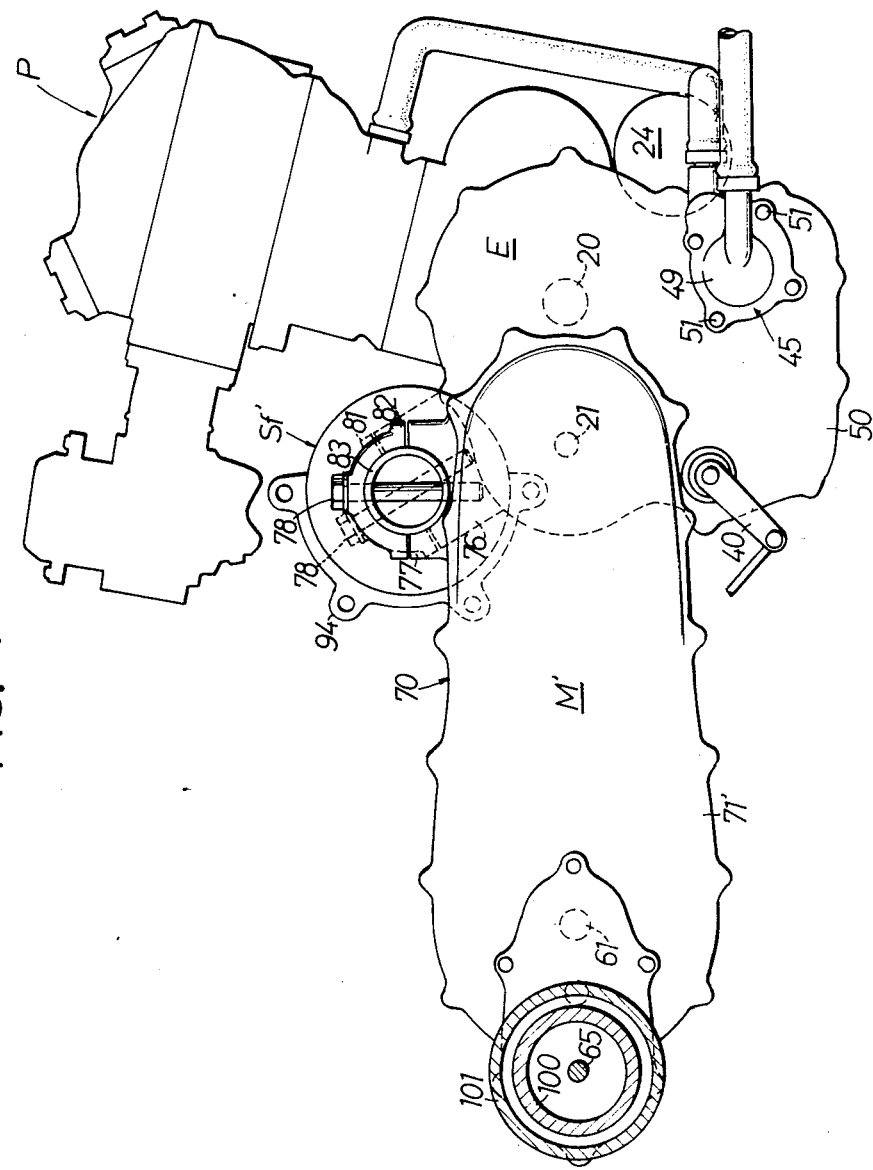
Figure 5:
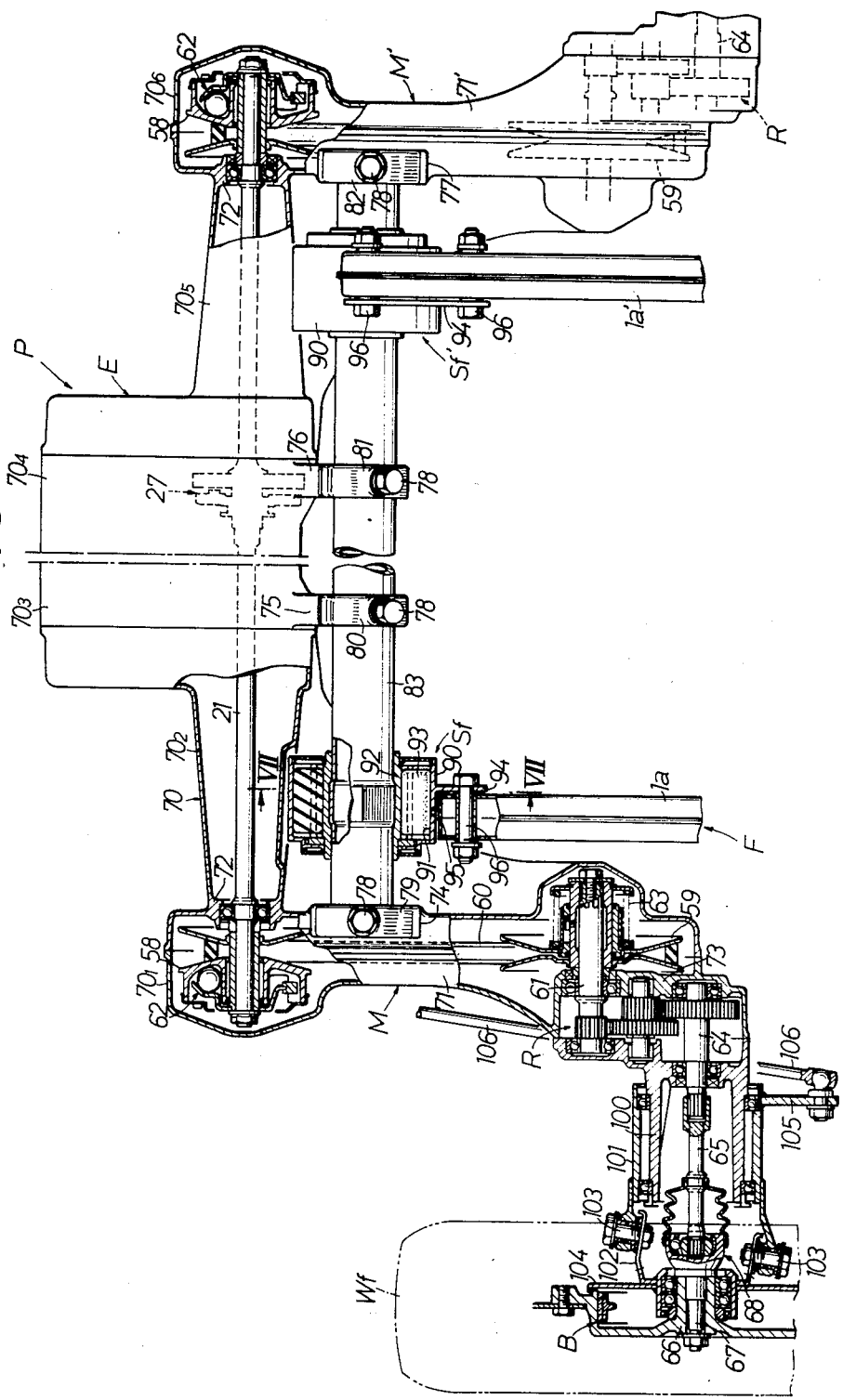
Figure 6:
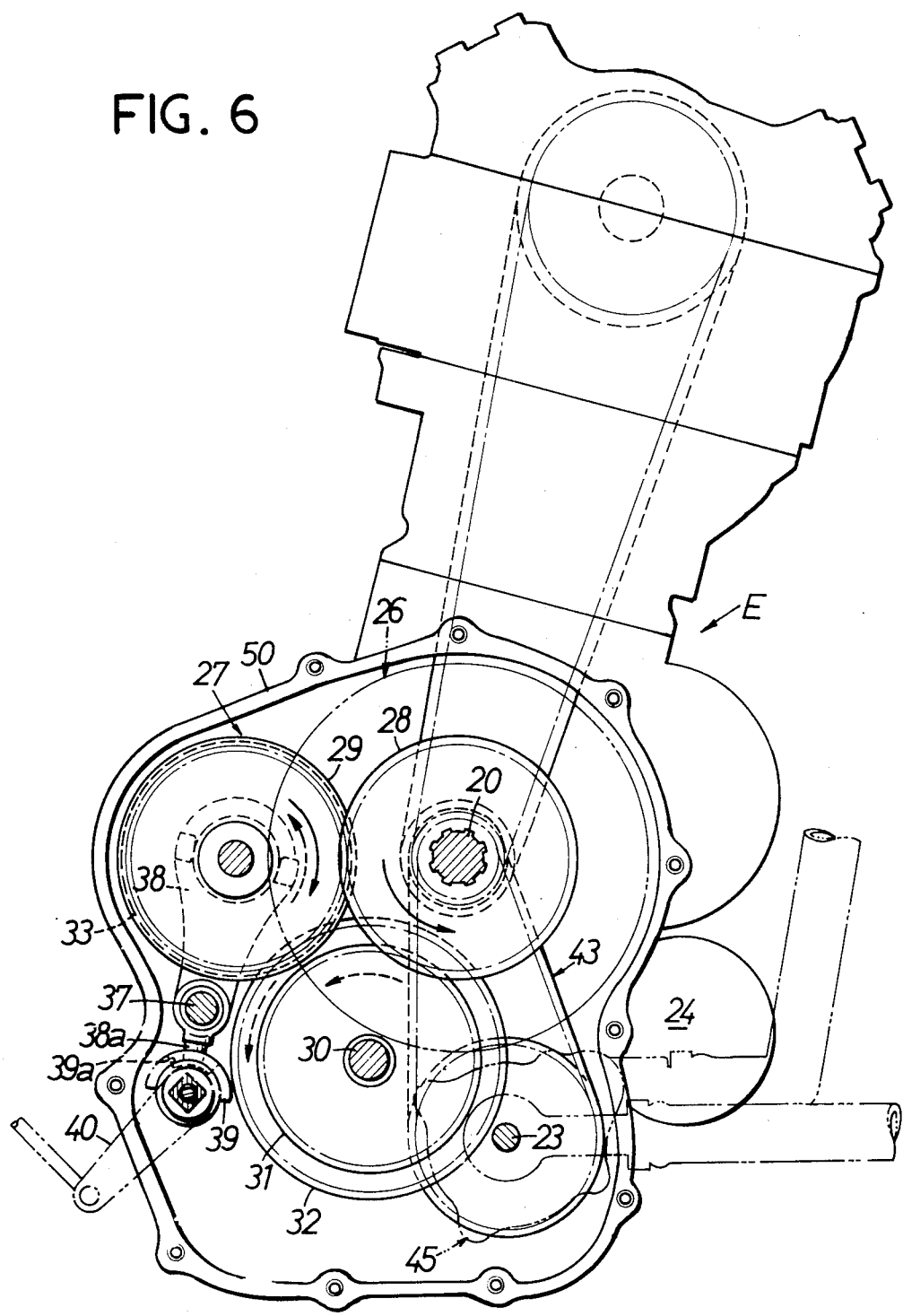

Referring to FIGS. 4 to 6, a power unit P comprises an engine E and a pair of left and right belt type automatic transmissions M, M' disposed so as to be extended substantially horizontally rearwardly from both ends of the engine, the transmissions M, M' being each provided with a reduction gear mechanism R on the outside thereof. These automatic transmissions M, M' constitute transmission devices of the present invention.

In the engine E, a crank shaft 20 thereof is arranged in a lateral direction of the vehicle. An output shaft 21 is disposed on one side of the crank shaft 20, and a primary inertia force balance shaft 22, a pump driving shaft 23 and a start motor 24 are disposed on the other side of the crank shaft 20 parallel to the latter. A generator 25 is mounted on one end of the crank shaft 20 and a centrifugal type automatic starting clutch 26 is mounted on the other end of the crank shaft 20, and a forward and reverse switching device 27 is provided between the clutch 26 and the output shaft 21.

The switching device 27 comprises a driving gear 28 secured to an output member of the clutch 26, a relay gear 29 rotatably supported on the output shaft 21 and normally meshed with the driving gear 28, a small diameter idle gear 31 rotatably supported on an idle shaft 30 parallel to the crank shaft 20 and likewise normally meshed with the driving gear 28, a large diameter idle gear integrally coupled to the small diameter idle gear 31, and a switching gear 33, adjacent to the relay gear 29 and the large diameter idle gear 32, slidably splined-fitted in the output shaft 21. The switching gear 33 is movable between the right-hand forward position and the left-hand reverse position in FIG. 5A along the output shaft 21 via a central neutral position. There is provided a dog clutch comprising a dog 34 formed on the switching gear 33 and a dog hole 35 formed on the relay gear 29 so as to be engageable with the dog 34, whereby the switching gear 33 is coupled to the relay gear 29 at the forward position. At the reverse position, the dog clutch (34, 35) is released so that the switching gear 33 is meshed with the large diameter idle gear 32.

If the switching gear 33 is set to the forward position, the rotational torque of the crank shaft 20 is transmitted to the output shaft 21 via the start clutch 26, the driving gear 28, the relay gear 29 and the switching gear 33 in said order to rotate the output shaft in a normal direction. If the switching gear 33 is shifted to the reverse position, the rotational torque is transmitted to the start clutch 26, the driving gear 28, the relay gear 29, the small diameter idle gear 31, the large diameter idle gear 32 and the switching gear 33 in said order to rotate the output shaft 21 in a reverse direction.

An annular engaging groove 36 is provided in the outer peripheral portion of a boss of the switching gear 33. A shift fork 38 slidably supported on a guide shaft 37 parallel to the crank shaft 20 engages the groove, and a projection 38a of a boss of the shift fork 38 engages a cam groove 39a of a shift drum 39 disposed parallel to the guide shaft 37. When the shift drum 39 is rotated in one direction or other direction by a shift lever 40 secured to one end thereof, the shift fork 38 can be displaced rightward or leftward by the guiding action of the cam groove 39a to shift the switching gear 33 to the forward or reverse position.

The aforesaid primary inertia force balance shaft 22 is synchronously rotated by the crank shaft 20 through a driving gear 41 and a driven gear 42 which have the same diameter. A weight 22a of the balance shaft 22 is provided at a position wherein the weight enters between a pair of opposed crank webs 20a, 20a when coming close to the crank shaft 20. The primary inertia force balancing action of the engine E by the weight 22a is known, explanation of which will not be made.

The aforesaid pump driving shaft 23 is driven by the crank shaft 20 through a chain transmission device 43. A lubricating oil pump 44 and a cooling water pump 45 are connected to one end and the other end, respectively, of the pump driving shaft 23, but the water pump 45 can be easily detached as will be described later.

That is, a rotational shaft 47 having an impeller 46 of the water pump 45 is connected to the pump driving shaft 23 through an insertable type joint 48 to carry the rotational shaft 47, and a pump housing 49 accommodating the impeller 46 therein is secured to a crank case 50 of the engine E by means of bolts 51. Thus, when the bolts 51 are removed, the water pump 45 can be easily removed from the engine E, which is convenient in maintenance. Where the engine E is of the air cooling type, the water pump 45 is removed as described above, and a suitable blind cover is applied to an opening of the crank case 50 behind the pump housing 49.

As shown in FIGS. 5A and 5B, a signal projection 52 of the ignition pulser is projectingly provided on the outer peripheral surface of a rotor 25a of the generator 25. A pickup coil 53 of the ignition pulser has a base plate 53a secured to a fixed support bed 54 within the crank case 50 by means of bolts 55 in such a way that the coil may face to a swivel path of the signal projection 52 with the presence of a given clearance. A work window 56 is provided on the end wall of the crank case 50 facing to the pickup coil 53 in order to facilitate adjustment of position and mounting or removal of the pickup coil 53, said window 56 being normally closed by a cap 57.

The pair of belt type automatic transmissions M, M' are disposed so as to connect between both ends of the output shaft 21 of the engine E and the left and right driving wheels Wf, Wf'. Thus, both the driving wheels Wf, Wf' are connected parallel to the output shaft 21 through the automatic transmissions M, M', respectively.

The belt type automatic transmissions M, M' are of the same construction, and therefore, the construction of the left transmission M will be merely described. A driving pulley 58 of variable diameter and a driven pulley 59 of variable diameter are mounted on the end of the output shaft 21 and a driven shaft 61 serving as an input shaft of the reduction gear mechanism R, respectively, and an endless V belt is stretched between both the pulleys 58 and 59. The driving pulley 58 is provided with a centrifugal mechanism 62 which is operated to increase an effective diameter thereof as the rotational speed increases, whereas the driven pulley 59 is provided with a spring 63 which normally functions so as to increase an effective diameter thereof. The speed change ratio between the output shaft 21 and the driven shaft 61 is automatically reduced, by the mutual action of the centrifugal mechanism 62 and spring 63, in response to the increase in rotational speed of the output shaft 21.

A front wheel driving shaft 65 is spline-coupled to an outer end of an output sbaft 64 of the reduction gear mechanism R, and an axle 67 secured to a hub 66 of the driving wheel Wf is connected to the wheel driving shaft 65 through a uniform joint 68. Thus, power changed in speed and transmitted to the driven shaft 61 is suitably amplified in torque by the reduction gear mechanism R and thereafter transmitted to the axle 67 via the wheel driving shaft 65 and uniform joint 68 to drive the driving wheel Wf.

Since the left and right driving wheels Wf and Wf' are connected parallel to the output shaft 21 through such automatic transmissions M, M', when a difference in rotational speed occurs between both the driving wheels Wf and Wf' resulting from the swivel of the vehicle or the like, a difference in speed change ratio between both the automatic transmissions M and M' occurs accordingly, as a consequence of which the output torque of the output shaft 21 is distributed to both the driving wheels Wf, Wf' in response to the rotational speed thereof. That is, the automatic transmissions M, M' not only display their normal speed change function but cooperate with each other to display the differential function.

A casing 70 for the power unit P is rigidly constructed by an integral connection of a crank case 50 for accommodating and supporting the crank shaft 20 of the engine E, the output shaft 21, etc and a pair of transmission cases 71, 71' extended rearwardly from both left and right ends of the crank case 50 to accommodate and support the automatic transmissions M, M'. Both the transmission cases 71, 71' are arranged substantially horizontally so as to hold the front end of the body frame F from left and right sides thereof. In this way, a space between both the transmission cases 71, 71' can be effectively utilized for a vehicle body space to render the vehicle compact and contribute to the lowering of centroid of the power unit P.

A diaphragm 72 for partitioning oil-tightly between the crank cas 50 and each of the transmission cases 71, 71' is provided therebetween, and a diaphragm 73 for partitioning oil-tightly between the transmission mechanism including both pulleys 58, 59 of the automatic transmissions M, M' and the reduction gear mechanism R is provided within each of the transmission cases 71, 71'. As for the lubricating system, a dry type and a wet type are employed in the transmission mechanism of each of the automatic transmissions M, M' and the reduction gear mechanism R, respectively.

The casing 70 is cast by dividing it into several blocks as described below. That is, in the central portion of the crank case 50, the intermediate portion between said central portion and each of the transmission cases 71, 71', and in the central portion of each of the transmission cases 71, 71', the casing is divided along a plane vertical to the axis of the crank shaft 20, and these divided portions are called first to sixth blocks, $70_1$–$70_6$, from the left in FIG. 5. These blocks $70_1$–$70_6$ are fastened by bolts between adjacent blocks.

Support brackets 74–77 are integrally projected on outer surfaces of the second to fifth blocks $70_2$–$70_5$, respectively. A pivot 83 disposed parallel to the crank shaft 20 is held between the support brackets 74–77 and support caps 79–82 fastened thereto through through-bolts 78, respectively, in order to connect the power unit P to the body frame F. At this time, support surfaces of the support brackets 74–77 and support caps 79–82 are formed into a semi-circular configuration which is easy in machining and can be brought into close contact with the peripheral surface of the pivot 83, and each of the through-bolts 78 is extended through the pivot 83 for locating and positively securing the pivot 83 to the casing 70. In this way, the second to fifth blocks $70_2$–$70_5$ are mutually fastened even by the pivot 83 and the connecting strength is increased.

Mating surfaces of each set of support brackets and caps 74, 79; 77, 82; 75, 80: 76, 81 are deviated in phase from each other in the peripheral direction of the pivot 83. In this way, portions, which are relatively weak in strength, of the support brackets 74–77 and the plurality of through-bolts 78 are not one-sided so that the pivot 83 may be rigidly supported in all directions.

Figure 7:
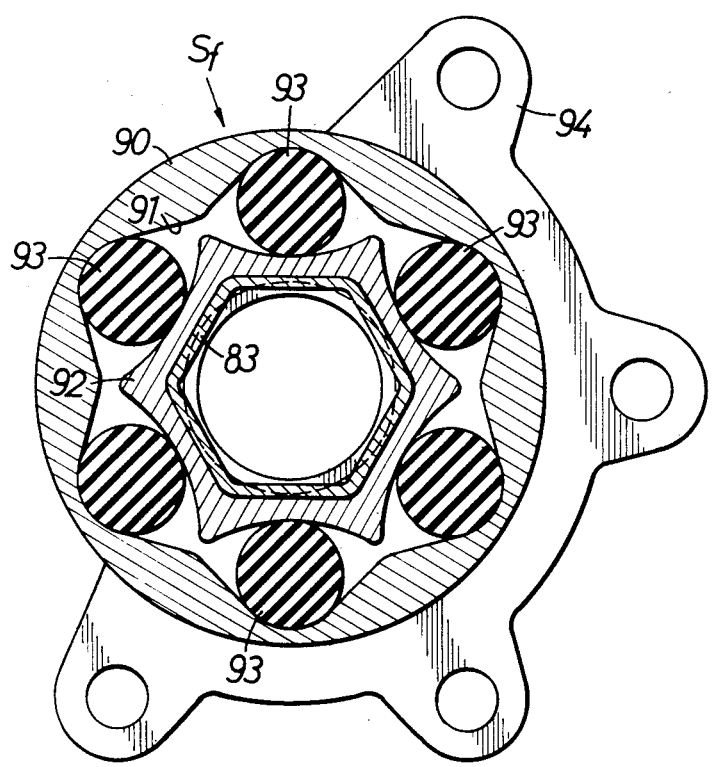

The pivot 83 is carried on left and right support plates 1a, 1a' of the hody frame F through a pair of left and right suspension spring devices Sf, Sf' internally of the support brackets 74, 77 at both external positions. In the illustrated embodiment, both the devices Sf, Sf' are of the Neidhart type and have the same construction, and therefore. onlY the left-hand device Sf will be described. As shown in FIG. 7, this spring device Sf comprises a housing 90 having a spring chamber 91 having a hexagonal cross sectional shape as a basic shape, a spring operating member 92 accommodated in the spring chamber 91 and six cylindrical rubber springs 93 filled between the housing 90 and the spring operating chamber 92 at six corners of the spring chamber 91, the spring operating member 92 being secured to the pivot 83 by being polysurface-fitted or spline-fitted therein. The housing is formed at its outer peripheral surface with a mounting flange 94 projected over the semi-periphery thereof.

On the other hand, th support plates 1a, 1a' of the body frame F are each formed with a semi-circular support recess 95 which is open frontwardly, and the housing 90 is fitted in the recess 95 so that the mounting flange 94 is secured to the support plates 1a, 1a' by means of a plurality of bolts 96.

If the power unit P is pivotally moved about the pivot 83 as the left and right driving wheels Wf, Wf' move up and down, the spring operating member 92 is rotated with respect to the housIng 90 to impart compression deformation to all the rubber springs 93 at the same time, and the driving wheels Wf, Wf' are resiliently suspended by repulsion of the rubber springs 93 generated as said deformation occurs. It is noted that since the casing 70 for the power unit P is formed into a rigid body to connect between both the driving wheels Wf, Wf' as previously mentioned, the casing has the function of a stabilizer wherein the vertical vibration of one driving wheel is restrained by the other driving wheel.

A hydraulic damper 97 is interposed between the support plates 1a, 1a' of the body frame F and the transmission cases 71, 71' in order to attenuate the vertical motion of both the driving wheels Wf, Wf'.

The pivot 83 is arranged so that it may pass the center of gravity of the power unit P. In this way, it is possible to materially reduce an inertia moment of a pivotal system about the pivot 83 comprising the driving wheels Wf, Wf' and the power unit P. As a consequence, the road surface follow-up properties of the driving wheels Wf, Wf' are enhanced and the Neidhart type spring devices Sf, Sf' are relieved from their burden of load.

In order to reduce the inertia moment while extending the length of a driving wheel support arm of the power unit P as long as possible, in the illustrated embodiment, the relatively heavy balance shaft 22, start motor 24 and water pump 45 are arranged frontwardly of the engine E so as to balance with the weight of the driving wheels Wf, Wf'. Arranging the water pump 45 frontwardly of the engine E is convenient because the maintenance therefor can be carried out without being disturbed by the body frame F.

A support cylinder 100 encircling the wheel driving shaft 65 is integrally formed on the outer surface ot each of the transmission cases 71, 71', and a knuckle 102 rotatably supporting the hub 66 of the corresponding driving wheels Wf, Wf' is connected to an outer cylinder 101 rotatably supported on the support cylinder 100 through a pair of king pins 103 coaxially arranged with a neck shaking center of the uniform joint 68 put therebetween, the knuckle 102 being connected to the steering handle 13 through a steering mechanism not shown. Thus, if the knuckle 102 is rotated about the king pin 103 by rotating the steering handle 13, the driving wheels Wf, Wf' can be changed in direction.

A back plate 104 of a brake system for the corresponding driving wheels Wf, Wf', of a drum type brake system B in the illustrated embodiment, is secured to the knuckle 102, and a restraining arm 105 projected on the outer surface of the outer cylinder 101 is connected to the body frame F through a torque rod 106 in order to restrain rotation of the back plate 104. Thus, the brake torque acting on the back Plate 104 at the time of braking is carried by the bodY frame F through the knuckle 102, the outer cylinder 101 and the torque rod 106. At the time of pivotal movement of the power unit P about the pivot 83, relative rotational displacement between the outer cylinder 101 in the connecting relation with the knuckle 102 and the support cylinder 100 is allowed so as to retain proper alignment of the driving wheels Wf, Wf'.

A rear fork 111 is vertically pivotably mounted on the rear end of the body frame F through a pivot 110, and the driven wheel Wr is supported at the rear end thereof. A spring device Sr having the same construction as that of the aforesaid Neidhart type spring device Sf is interposed between the pivot 110 and the rear fork 111 to suspend the rear fork 111. A hydraulic damper 112 is interposed between the rear fork 111 and the body frame to attenuate the vertical motion of the driven wheel Wr.

Figure 8:
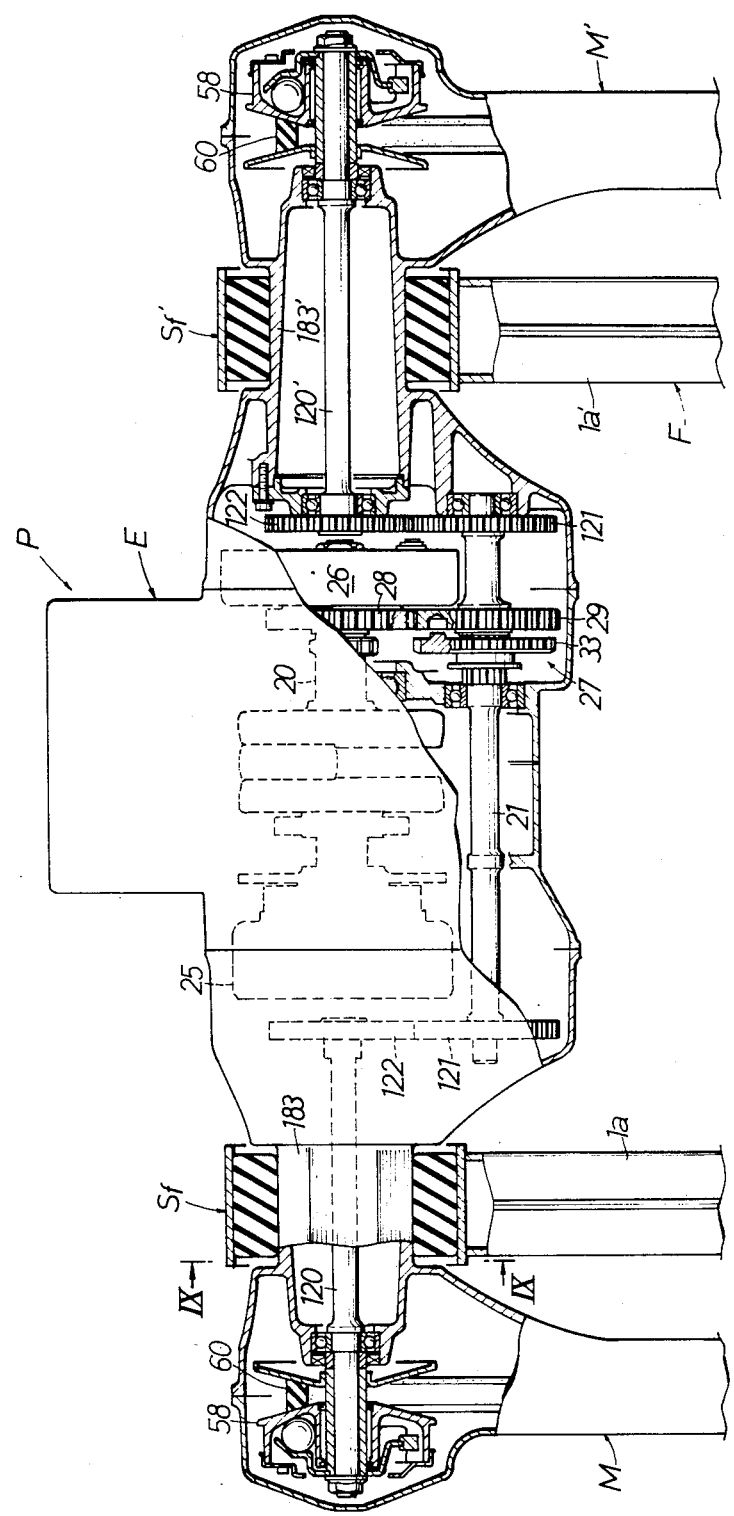
Figure 9:
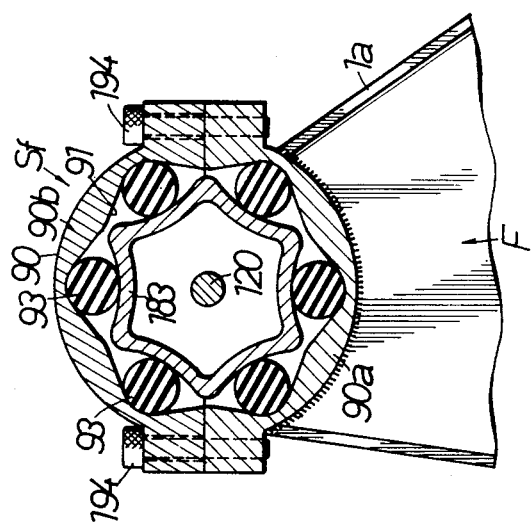

FIGS. 8 and 9 show a second embodiment of the present invention. Only the points different from the first embodiment will be described. Input shafts 120, 120' for mounting the driving pulley 58 for the automatic transmissions M, M' are separated from the output shaft 21 of the engine E and arranged on the same axis adjacent both ends of the crank shaft 20. A portion between the input shafts 120, 120' is connected through a driving gear 121 and a driven gear 122. A portion encircling the input shafts 120, 120' of the casing 70 for the power unit P is formed into hexagonal cylindrical pivots 183, 183' disposed on the same axis as that of the crank shaft 20, and the pivots 183, 183' are supported on the body frame F through the Neidhart type spring devices Sf, Sf'. The suspension spring devices Sf, Sf' are of the Neidhart type and have the same construction, and therefore, only the left device Sf will be described. As shown in FIG. 9, the spring device comprises a two split housing 90 having a spring chamber 91 having a hexagonal cross sectional shape as a basic shape and accommodating therein a pivot 183 corresponding to the spring chamber 91 and six cylindrical rubber springs 93 filled between the housing 90 and the pivot 183 at six corners of the spring chamber 91. One half portion 90a of the two split housing 90 is fixedly mounted on the corresponding support plate 1a by welding or the like, and the other half portion 90b is fastened to the half portion 90a by bolts 194.

In the above-described arrangement, if the engine E gives rise to twist vibrations about the axis of the crank shaft 20 resulting from variation in torque of the crank shaft 20, the simple twist force merely acts on the suspension spring devices Sf, Sf' since the pivots 183, 183' are positioned in the center of said twist vibration. This can be effectively absorbed by the compression deformation of the rubber spring 93 similar to the case previously described.

Other structures of the second embodiment are similar to those of the above-described first embodiment, and therefore, parts in FIG. 8 corresponding to those of the first embodiment bear the same reference numerals.

Figure 10:
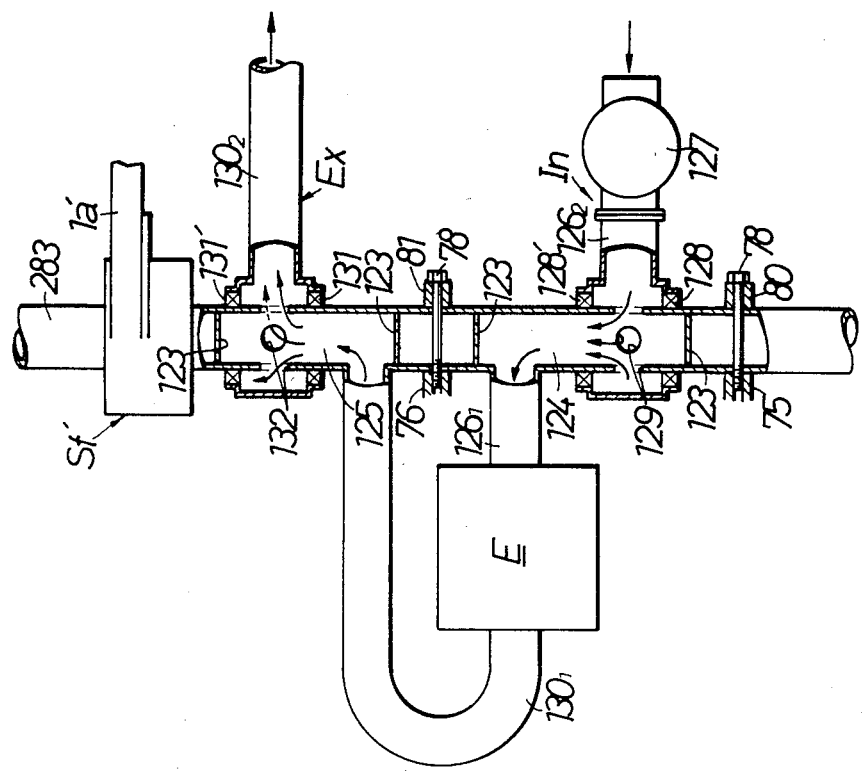
FIG. 10 is a plan view of a suction and exhaust system of the engine with essential parts sectioned, in a third embodiment of the present invention.

FIG. 10 shows a third embodiment of the present invention. The pipe line system is applied to an intake system In and an exhaust system Ex of the engine E as follows:

That is, a pivot 283 is formed into a hollow configuration, in which a first chamber 124 and a second chamber 125 are formed by a plurality of diaphragms 123, and the first chamber is utilized for the intake system In and the second chamber 125 is utilized for the exhaust system Ex.

First, the construction of the intake system In will be described. The intake system In comprises a first intake pipe $126_1$ in communication with an intake port of the engine E (said first intake pipe corresponding to a first pipe line), a carbureter 127, and a second intake pipe $126_2$ (corresponding to a second pipe line) in communication with an intake passage outlet of the carbureter 127. And, the first intake pipe $126_1$ is connected to one side of the pivot 283 so as to communicate with the first chamber 124, and the second intake pipe $126_2$ is relatively rotatably connected to the pivot 283 at the position of the first chamber 124 through a pair of seal members 128, 128'. A plurality of through-holes 129 are bored in the peripheral wall of the pivot 283 so as to communicate the second intake pipe $126_2$ with the first chamber 124 between both the seal members 128', 128'. In this way, the first and second intake pipes $126_1$, $126_2$ are brought into communication with each other through the first chamber 124. The carbureter 127 is supported on the body frame F through a suitable support member (not shown). Accordingly, the second intake pipe $126_2$ is supported on the body frame F through the carbureter 127.

Next, the exhaust system Ex comprises a first exhaust pipe $130_1$ (corresponding to a first pipe line) in communication with the exhaust port of the engine E, and a second exhaust pipe $130_2$ (corresponding to a second pipe line) in communication with an inlet of an exhaust muffler not shown. And, the first exhaust pipe $130_1$ is connected to one side of the pivot 283 so as to communicate with the second chamber 125, and the second exhaust pipe $130_2$ is relatively rotatably connected to the pivot 283 at the position of the second chamber 125 through a pair of seal members 131, 131'. A plurality of through-holes 132 are bored in the peripheral wall of the pivot 283 so as to communicate the second exhaust pipe $130_2$ with the second chamber 125 between both the seal members 131, 131'. In this way, the first and second exhaust pipes $130_1$, $130_2$ are brought into communication with each other through the second chamber 125. The second exhaust pipe $130_2$ is supported on the body frame F through a suitable support member (not shown).

In this way if the power unit P is pivotally moved about the axis of the pivot 283 as the driving wheels Wf, Wf' move up and down, the first intake pipe $126_1$ and the first exhaust pipe $130_1$ on the side of the power unit P are pivotally moved along with the pivot 283 but the second intake pipe $126_2$ and the second exhaust pipe $130_2$ on the side of the body frame F are maintained in a static condition.

A mixture created in the carbureter 127 by the intake stroke of the engine E during such movement is taken into the cylinder of the engine E via the second intake pipe $126_2$, the through-holes 129, the first chamber 124 and the first intake pipe $126_1$. Exhaust gas discharged from the cylinder by the exhaust stroke is released into the atmosphere via the first exhaust pipe $130_1$, the second chamber 125, the through-holes 132, the second exhaust pipe $130_2$ and the exhaust muffler in said order.

Particularly, where the pipe line device is applied to the intake system In to support the carbureter 127 on the body frame F, a level of fuel oil in a float chamber of the carbureter 127 can be always stabilized. Therefore, the amount of pivotal movement of the power unit P, that is, the up stroke of the driving wheels Wf, Wf' can be set to a sufficiently large value without consideration of the oil level characteristic.

In the above-described construction, if the pivot 283 is secured to the body frame F to give rise to relative pivotal movement between the power unit P and the pivot 283, the first intake pipe $126_1$ and the first exhaust pipe $130_1$ on the side of the power unit P can be pivotably connected to the pivot 283. Where the pipe line device is applied to the cooling system, a radiator is supported on the body frame F, and a water pipe connecting between the radiator and the engine E can be divided into two pipes, which can be connected through the pivot 283 in a manner similar to the intake and exhaust systems In, Ex.

Other structure of the third embodiment are similar to those of the above-described first embodiment, and therefore, parts in FIG. 10 corresponding to those of the first embodiment bear the same reference numerals.

Figure 11:
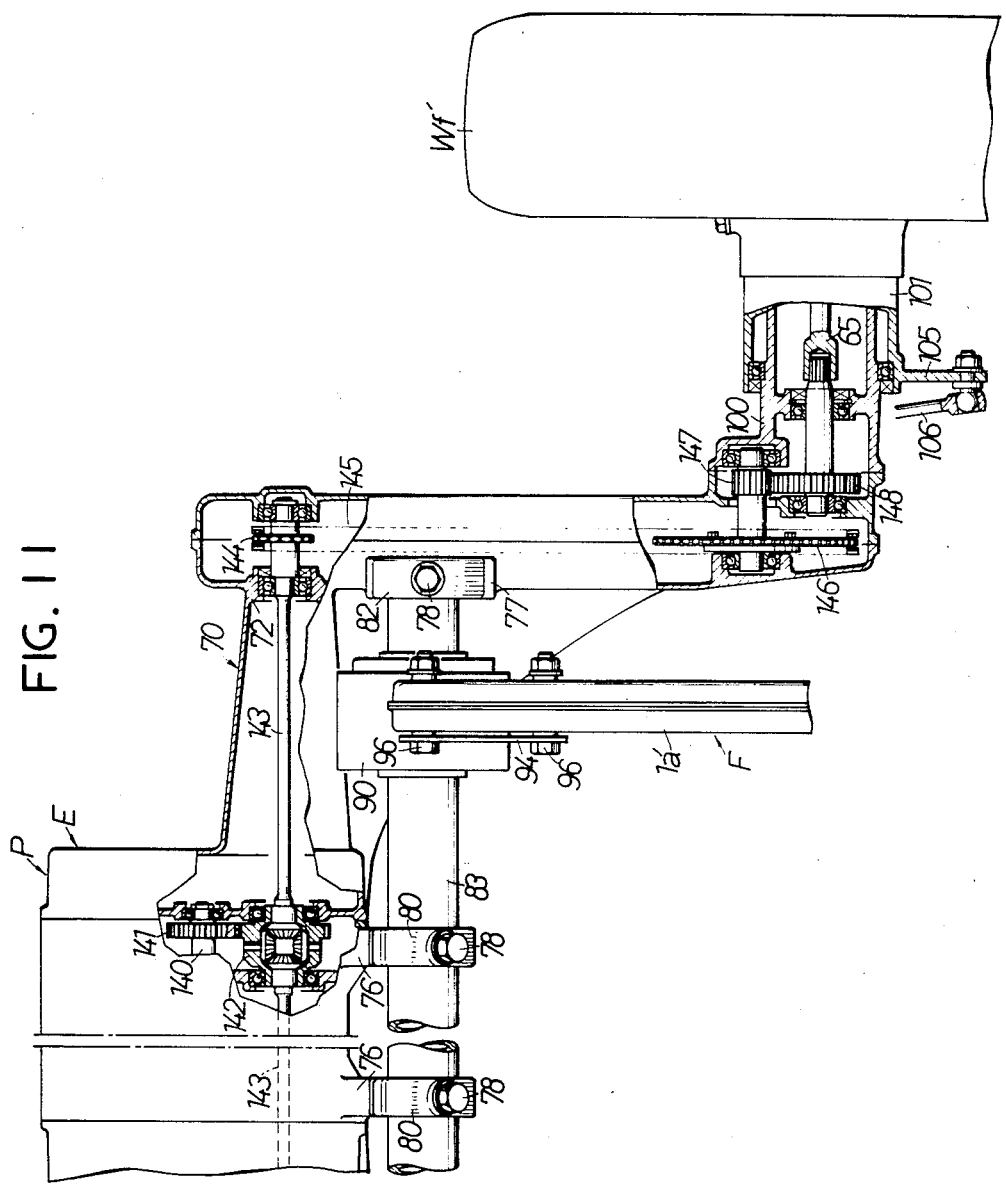
FIG. 11 is a plan view of the power unit with essential parts sectioned, in a fourth embodiment of the present invention.

FIG. 11 shows a fourth embodiment of the present invention, in which case, the transmission device employs the chain type. In this case, power is transmitted to the driving wheels Wf, Wf' via a gear 141 of a transmission shaft 140 driven by the engine E, a differential device 142, a driving shaft 143, a small diameter sprocket 144, a transmission chain 145, a large diameter sprocket 146, a small diameter gear 147, a large diameter gear 148 and a wheel driving shaft 65.

Figure 12:
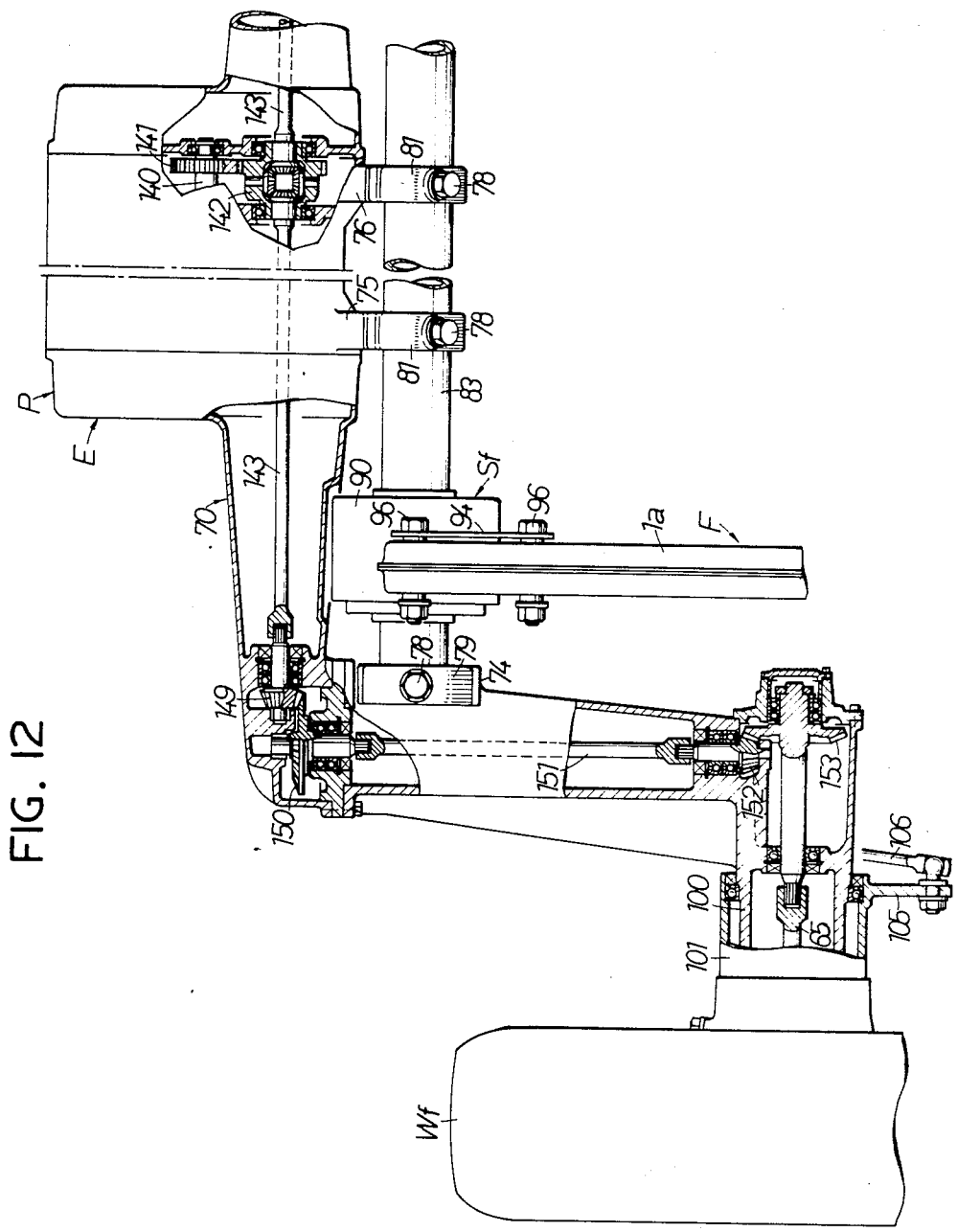
FIG. 12 is a plan view of the power unit with essential parts sectioned, in a fifth embodiment of the present invention.

FIG. 12 shows a fifth embodiment of the present invention, in which case, the transmission device employs the shaft type. In this case, power is transmitted to the driving wheels Wf, Wf' via a gear 141 of a transmission shaft 140 driven by the engine E, a differential device 142, an output shaft 143, a small diameter bevel gear 149, a large diameter bevel gear 150, a transmission shaft 151, a small diameter bevel gear 152, a large diameter bevel gear 153 and a wheel driving shaft 65.

Other structures of the fourth and fifth embodiment are similar to those of the abvoe-described first embodiment, and therefore, parts in FIGS. 11 and 12 corresponding to those of the first embodiment bear the same reference numerals.

It is noted that the suspension spring device is not limited to the Neidhart type as in the previous embodiment but the device can be of the expansion type which comprises a coil spring interposed between a pivotal arm secured to the pivot and the body frame.

While several embodiments have been described, it should be noted that various changes can be made within the scope of conception of the present invention described in the ensuing claims.

What is claimed is:

1. A vehicle in which a pair of driving wheels are disposed on the left and right sides of a vehicle body frame, said vehicle comprising a power unit composed of an engine, laterally extending drive means in driving connection to said engine, and a pair of transmission devices on each side of said vehicle extending longitudinally and in driving connection to said drive means with the driving wheels connected to the extending ends of each transmission device to individually transmit power from said engine to said driving wheels, a casing for the entire said power unit being formed into a rigid body, said casing supporting both the driving wheels and both said tansmission devices laterally outside the said body frame, and said casing being supported on said body frame to resiliently pivot about a lateral axis to allow resilient vertical movement of the driving wheels and said transmission devices.

2. A vehicle according to claim 1, wherein said transmission devices are arranged substantially horizontally.

3. A vehicle according to claim 1, wherein said transmission devices comprise a belt type automatic transmission which connects an output shaft of the engine to said driving wheels.

4. A vehicle according to claim 1, 2 or 3, wherein said casing is pivotably supported on said body frame through pivot means so as to allow upward and downward movement of both the driving wheels, and a suspension spring device is interposed between said casing and said body frame.

5. A vebicle according to claim 4, wberein said pivot means is supported between a plurality of support brackets projected on said casing and a plurality of support caps fastened to said support brackets by means of bolts. and mating surfaces between said support brackets and caps are deviated from each other in phase in the peripheral direction of said pivot means.

6. A vehicle according to claim 5, wherein said casing comprises a plurality of blocks divided in an axial direction of said pivot and fastened together, and said support brackets are projectingly provided on said blocks.

7. A vehicle according to claims 5 or 6, wherein said support brackets and said caps respectively have semicircular supporting surfaces between which said pivot means is held, said bolt comprises a through-bolt which extends through said cap and said pivot means and is threadably engaged with said support bracket, and said suspension spring device is interposed between said pivot means and said body frame.

8. A vehicle according to claim 4, wherein said pivot means is arranged so that it may pass the center of gravity of said power unit or the neighbourhood thereof.

9. A vehicle according to claim 4, wherein said pivot means is arranged on substantially the same axis as that of the crank shaft of said engine.

10. A vehicle wherein a casing for a power unit which supports and drives driving wheels and which is pivotably supported on a vehicle body frame through a pivot means so as to allow upward and downward movement of said driving wheels, said Pivot means being formed into a hollow configuration and secured to said power unit, a first pipe line supported on said casing being connected to said pivot means, a second pipe line supported on said body frame being connected relatIvely pivotably to said pivot, said first and second pipe lines being communicated with each other through the hollow portion of said pivot means.

11. A vehicle wherein a casing for a power unit which supports and drives driving wheels and which is pivotably supported on a vehicle body frame through a pivot means so as to allow upward and downward movement of said driving wheels, said pivot means being formed into a hollow configuration and secured to said power unit, a first pipe line supported on said casing being connected relatively rotatably to said pivot means, a second pipe line supported on said body frame being connected to said pivot means, said first and second pipe lines being connected together through the hollow portion of said pivot means.

12. In a vehicle with a frame and a pair of driving wheels at one end, the combination of, a rigid casing means mounted on and extending across the frame at said one end, said casing means mounted for pivoting about a lateral axis and having portions on the outside of the frame extending longitudinally from said lateral axis with means on said portions for rotatably supporting the driving wheels at a location spaced from said lateral axis for rotation on an axis parallel to said lateral axis, said casing means provided with an engine and drive means for driving said driving wheels, and means for resiliently resisting pivoting of said casing means in response to vertical movement of the driving wheels.

13. The vehicle of claim 12 wherein said drive means includes variable speed transmission means in each said longitudinally extending portion of said casing means for separately driving each of the driving wheels.

14. The vehicle of claim 12 wherein said engine has a crankshaft on a lateral axis spaced from the said lateral axis on which the said casing means pivots.

15. The vehicle of claim 14 wherein said engine is located centrally in the lateal direction and offset longitudinally from said lateral axis in the opposite direction as said longitudinally extending portions of said casing means.

* * * * *